United States Patent [19]
Bronicki et al.

[11] Patent Number: 5,632,148
[45] Date of Patent: May 27, 1997

[54] POWER AUGMENTATION OF A GAS TURBINE BY INLET AIR CHILLING

[75] Inventors: Lucien Y. Bronicki, Yavne; Uriyel Fisher, Haifa, both of Israel

[73] Assignee: Ormat Industries Ltd., Yavne, Israel

[21] Appl. No.: 59,565

[22] Filed: May 12, 1993

Related U.S. Application Data

[63] Continuation-in-part of Ser. No. 881,763, May 12, 1992, abandoned, which is a continuation-in-part of Ser. No. 818,123, Jan. 8, 1992, abandoned.

[51] Int. Cl.$^6$ .................................................. F02C 6/00
[52] U.S. Cl. ............................................................. 60/728
[58] Field of Search .................... 60/39.05, 39.182, 60/39.83, 728; 415/179

[56] References Cited

U.S. PATENT DOCUMENTS

| | | | |
|---|---|---|---|
| 3,796,045 | 3/1974 | Foster-Pegg | 60/728 |
| 3,877,218 | 4/1975 | Nebgen | 60/39.05 |
| 4,418,527 | 12/1983 | Schlom et al. | 60/39.05 |
| 4,702,074 | 10/1987 | Munk | 60/728 |

FOREIGN PATENT DOCUMENTS

| | | |
|---|---|---|
| 83 0204 | 10/1983 | South Africa . |
| 2051238 | 1/1981 | United Kingdom . |

OTHER PUBLICATIONS

Ondryas et al., "Options in Gas Turbine Power Augmentation Using Inlet Air Chilling" Presented at the Gas Turbine and Aeroengine Congress and Exposition—Jun. 11–14, 1990—Brussels, Belgium.

J. Ebeling and R. Balsbaugh, "Combustion Turbine Inlet Cooling Project," *Turbomachinery International*, Jan./Feb. 1993, pp. 30–33.

J. Ebeling, R. Halil, D. Bantam, B. Bakenhus, H. Schreiber and R. Wendland, "Peaking Gas Turbine Capacity Enhancement Using Ice Storage for Compressor Inlet Air Cooling," Presented at the International Gas Turbine and Aeroengine Congress and Exposition; Cologne, Germany, Jun. 1–4, 1992.

*Primary Examiner*—Timothy S. Thorpe
*Attorney, Agent, or Firm*—Donald M. Sandler

[57] ABSTRACT

In order to augment the power produced by a gas turbine system of a type having an air compressor for producing compressed air, a combustor for heating the compressed air, and a gas turbine responsive to the heated air for driving the air compressor and the load, cooling air is supplied to the compressor by indirectly contacting the air with water that is chilled by flashing some of the water into a vapor.

13 Claims, 12 Drawing Sheets

POWER AUGMENTATION OF A GAS TURBINE BY INLET AIR CHILLING

RELATED APPLICATIONS

This application is a continuation-in-part of application Ser. No. 07/881,763 filed May 12, 1992 which is, itself, a continuation-in-part of application Ser. No. 07/818,123 filed Jan. 8, 1992 both now abandoned. The disclosures of both of these applications are hereby incorporated by reference.

TECHNICAL FIELD

This invention relates a method of and apparatus for augmenting the power of a gas turbine by chilling the inlet air to the compressor of the gas turbine.

BACKGROUND ART

In a paper, hereby incorporated by reference, entitled "Options in Gas Turbine Power Augmentation Using Inlet Air Chilling" by I. S. Ondryas et al. presented at the Gas Turbine and Aeroengine Congress and Exposition on Jun. 11–14, 1990 in Brussels, Belgium, the authors discuss the use of adsorption chillers and/or mechanical/electrical chillers for cooling inlet air in a gas turbine based cogeneration plant. Such cooling increases the capacity of the plant, particularly during peak demand periods in the summer. The cost of equipment to effect such cooling is amortized by the economic benefit gained from increased revenues derived during peak operations.

Although the paper discloses using heat contained in gases exhausted from the gas turbine to generate steam that is applied to an adsorption chilling system based on lithium bromide, or ammonia, an economic comparison is made of systems based on a centrifugal, two-stage ammonia based adsorption system, and a hybrid of these two techniques. The paper shows that, in terms of shortest payback period, a two-stage ammonia adsorption system is the most attractive.

The conventional refrigeration systems described in the above-identified article are capable of providing low temperatures for air conditioning, refrigeration, and ice making purposes, which are significantly below the minimum 45° F. temperature considered suitable for inlet air chilling in a gas turbine based power plant. Inlet air temperatures lower than about 45° F. should be avoided to prevent ice build-up on the compressor blades taking into account a drop of about 10° F. in the static air temperature in the compressor inlet, and a 3° F. safety margin. Conventional refrigeration systems to achieve these rather modest cooling goals without using chlorinated fluorocarbons (CFC's) which are ecologically damaging, and high voltage electrical components to support chiller motors, etc., are often complicated, and hence expensive, reducing the advantages of inlet air chilling.

It is therefore an object of the present invention to provide apparatus for augmenting the power produced by a gas turbine system which is simpler in design and operation than apparatus of this type disclosed in the above-identified paper.

BRIEF DESCRIPTION OF THE INVENTION

The present invention provides apparatus and method for augmenting the power produced by a gas turbine system of the type having an air compressor for producing compressed air, a heater such as a combustor for heating the compressed air, a gas turbine responsive to the heated air for driving the air compressor and a load, and for producing exhaust gases. The apparatus according to the invention comprises means for cooling the air supplied to the compressor, the cooling means preferably including a closed contact heat exchanger through which air is supplied to the compressor, a closed reservoir of water, and means for exchanging water between the reservoir and the heat exchanger. According to the present invention, an auxiliary compressor is provided having an inlet preferably connected to the reservoir and having an outlet. Drive means are provided for operating the auxiliary compressor to reduce the pressure in the reservoir thereby flashing some of the liquid water into water vapor which reduces the temperature of the liquid water remaining in the reservoir. The water vapor is compressed by the operation of the auxiliary compressor to produce heated, compressed water vapor at the outlet of the compressor. A condenser is connected to the outlet for condensing the heated, compressed water vapor into liquid condensate, and means connecting the condenser to the reservoir for controlling the return of the liquid condensate to the reservoir. The cooling effected by the flash operation that occurs in the reservoir is sufficient to produce a water temperature in the reservoir suitable for use in cooling the inlet air to the compressor of the gas turbine.

To further improve the efficiency of the system, the present invention may include drive means for operating the auxiliary compressor using heat extracted from the exhaust of the turbine. In such case, the drive means may include a vaporizer responsive to the exhaust gases from the gas turbine for converting liquid working fluid to vaporized working fluid, and an auxiliary turbine mechanically coupled to the auxiliary compressor and responsive to the vaporized working fluid for expanding the latter thereby driving the auxiliary compressor and producing heat depleted working fluid. An auxiliary condenser condenses the heat depleted working fluid, and means are provided for pumping the condensate from the auxiliary condenser into the vaporizer.

BRIEF DESCRIPTION OF THE DRAWINGS

Embodiments of the present invention are described by way of example and with reference to the accompanying drawings wherein.

DETAILED DESCRIPTION

Figure 1:
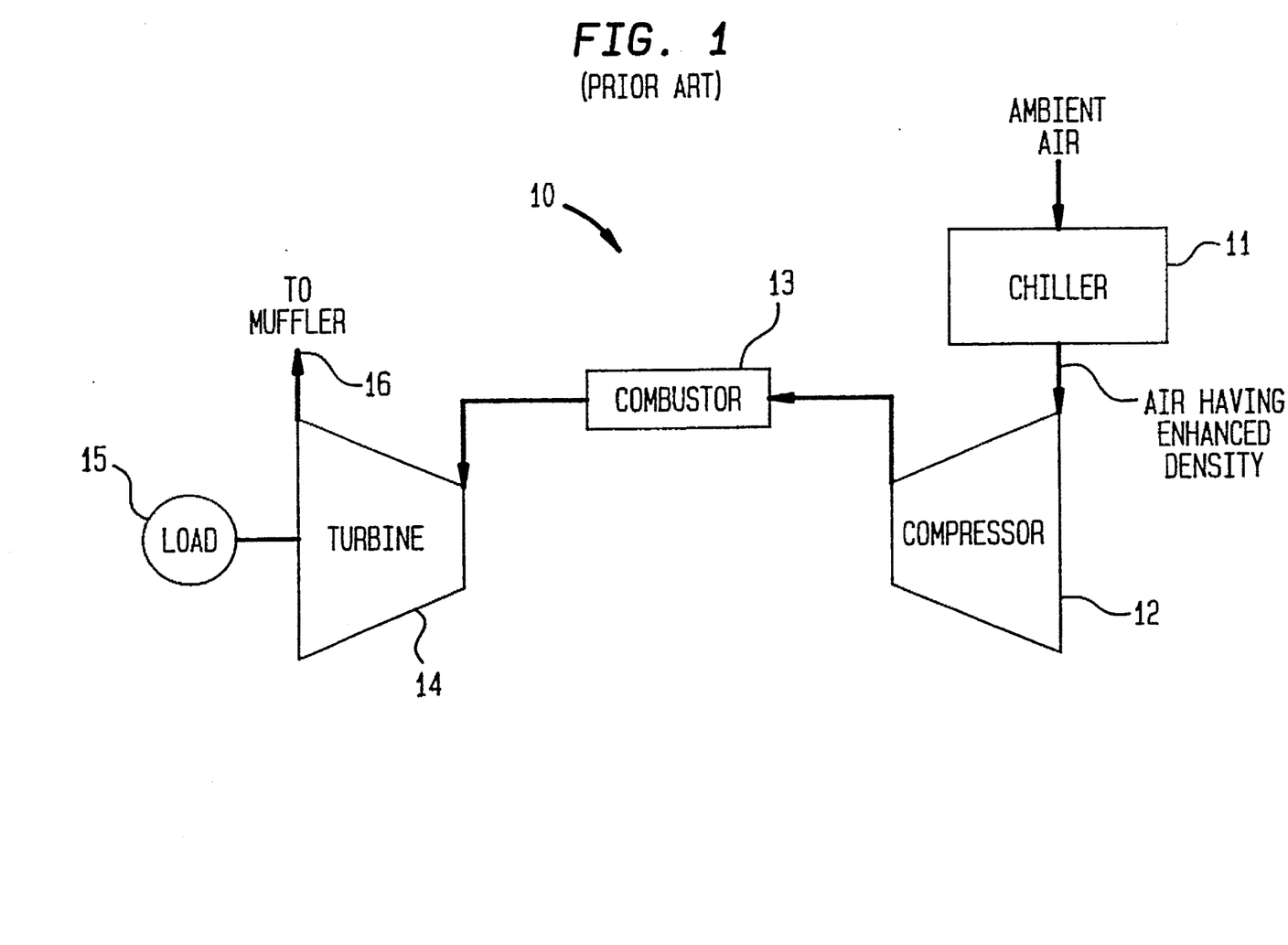
FIG. 1 is a block diagram of a prior art gas turbine system having conventional apparatus for augmenting the power produced.

Turning now to the drawings, reference numeral 10 in FIG. 1 represents a plant based on a gas turbine system and using inlet air chilling. Specifically, ambient air enters chiller 11 which may operate in accordance with the principles described in the above-identified paper, the air being significantly cooled to a temperature around 45° F. The cool air enters air compressor 12 which compresses the air before it is supplied to combustor 13. Fuel is burned in combustor 13 for producing hot gases that are applied to gas turbine 14 which drives load 15 which may be an electrical generator for producing electricity. Gases exhausted from turbine 14 are usually applied to muffler 16 before being vented to the air.

As described in the above-identified paper, the output of the turbine is increased by 0.36% for each 1° F. reduction in inlet air temperature. For example, if the ambient air temperature is 95° F., which represents, on the average, ambient temperature on a typical summer day in the United States when peaking is required, and if the chilled temperature is 52° F., the 43° F. reduction in temperature would result in a 15.5% boost in the output of the turbine.

Figure 2:
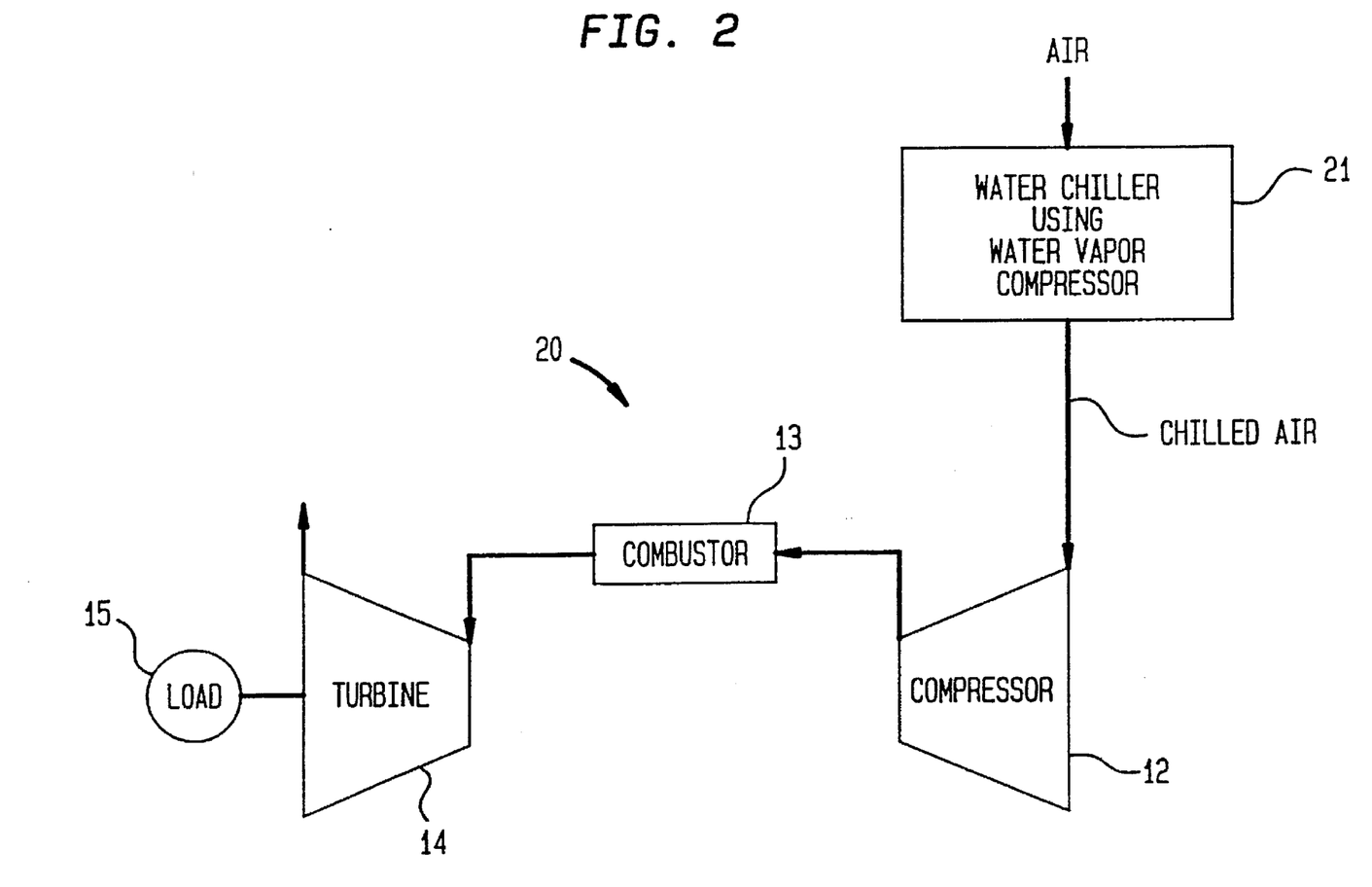
FIG. 2 is a schematic block diagram of an embodiment of the present invention schematically showing a water chiller that utilizes a water vapor compressor.
Figure 2A:
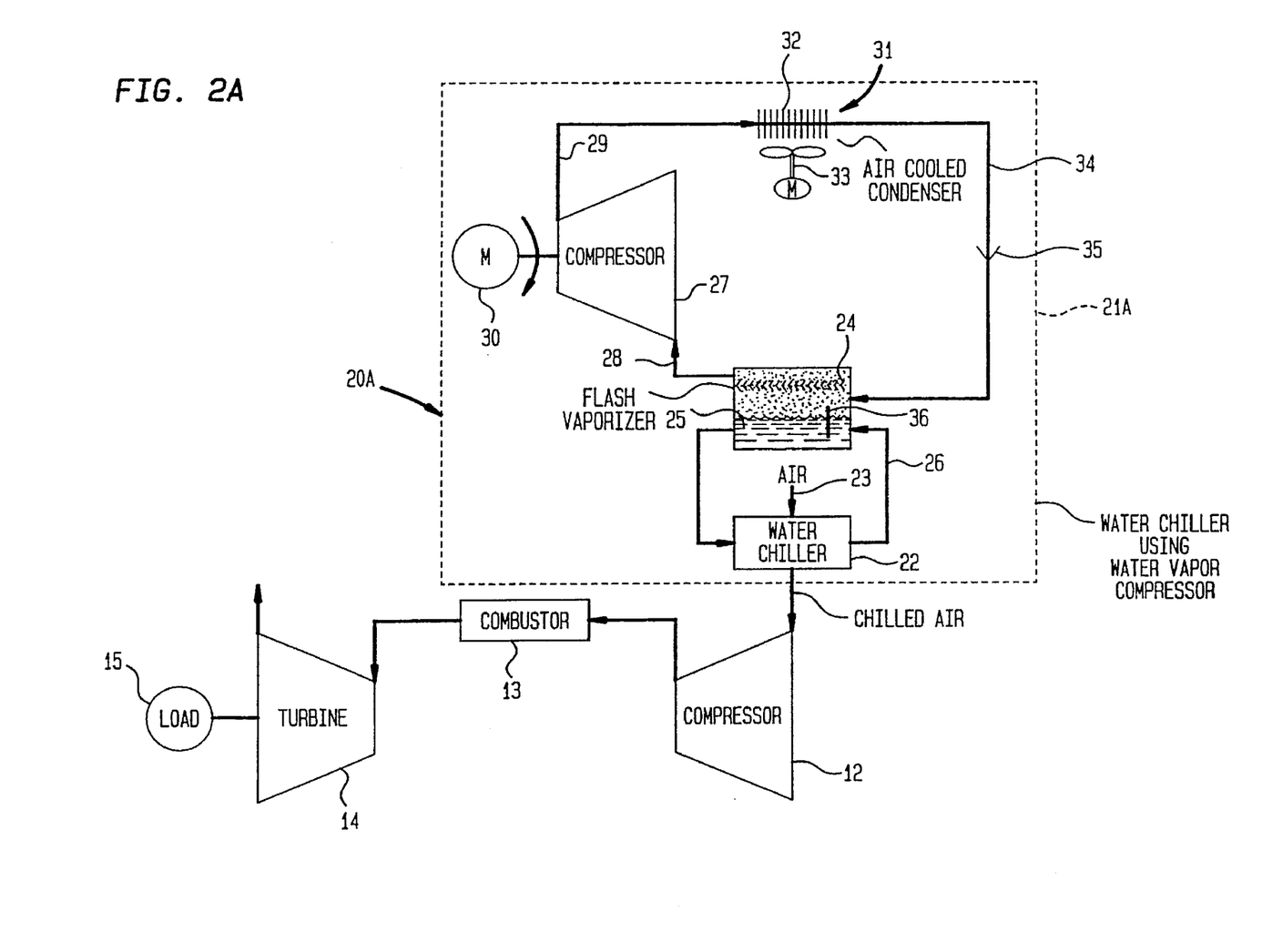
FIG. 2A is a schematic diagram of one embodiment of an air chiller according to the present invention.

An embodiment of the present invention is illustrated in FIG. 2 wherein ambient air enters chiller 21, which utilizes a water vapor compressor, is cooled thereby, and enters compressor 12 which operates in the manner described previously. Chiller 21 may have several configurations, one of which is illustrated in FIG. 2A to which reference is now made. As shown in FIG. 2A, power plant 20A includes chiller 21A that utilizes a water vapor compressor. Specifically, chiller 21A includes indirect contact heat exchanger 22 through which air, usually ambient air, at 23 is supplied to the inlet of compressor 12. Chiller 21A also includes flash vaporizer 24 which is in the form of a closed reservoir containing water 25. Means 26, which may include a pump (not shown) effects the exchange of water between the reservoir and heat exchanger 22.

Chiller 21A also includes auxiliary compressor 27 having inlet 28 connected to the vaporizer and having outlet 29 through which the gas compressed by compressor 27 exits the compressor. Motor 30 constitutes drive means for operating auxiliary compressor 27 such that the pressure inside the vaporizer 24 is reduced thereby flashing some of water 25 into vapor (steam) and reducing the temperature of water 25 remaining in the vaporizer. Auxiliary compressor 27 driven by motor 30 compresses the water vapor drawn from vaporizer 24 producing heated, compressed steam at outlet 29.

Chiller 21A also includes condenser 31 connected to outlet 29 of the compressor for condensing the heated, compressed steam flowing through the condenser. Specifically, condenser 31 is in the form of an air cooled condenser comprising finned tubes 32 over which ambient air is blown by reason of the operation of blower 33. The result of this arrangement is the condensation of the heated compressed steam as supplied to the condenser. Means 34, in the form of suitable piping, connect the outlet of condenser 31 to vaporizer 24 via constriction valve 35 in the piping. Valve 35 is provided for the purpose of controlling the return of liquid condensate produced by the condenser to the vaporizer.

Water chillers similar to that shown in FIG. 2A are shown and described in South African Patent No. 83/0204 issued Oct. 26, 1983, the subject matter of which is hereby incorporated by reference. In the operation of the apparatus shown in FIG. 2A, air, usually ambient air, enters water chiller 22 where it is cooled to a suitable low temperature, for example, around 45° F., before entering compressor 12 wherein the chilled air is compressed before being supplied to combustor 13. There, fuel is mixed with and burned in the air and the resulting hot gases are supplied to gas turbine 14 for driving load 15.

Motor 30 driving auxiliary compressor 27 produces a below atmospheric pressure within vaporizer 24 thereby flashing some of water 25 into steam which is compressed and heated by the compressor. The compressed steam exits outlet 29 before entering condenser 31 where the steam is condensed. Condensate produced by the condenser is returned through nozzle 35 to the vaporizer. Baffle 36, preferably present in the vaporizer, serves to separate the warmer water returned from chiller 22 from the cooler water produced by vaporization in the flash chamber. The heat extracted from the air as it passes through chiller 22 is transferred to water 25 in the vaporizer, and the heat therein is transferred to the air by reason of the operation of condenser 31.

Figure 2B:
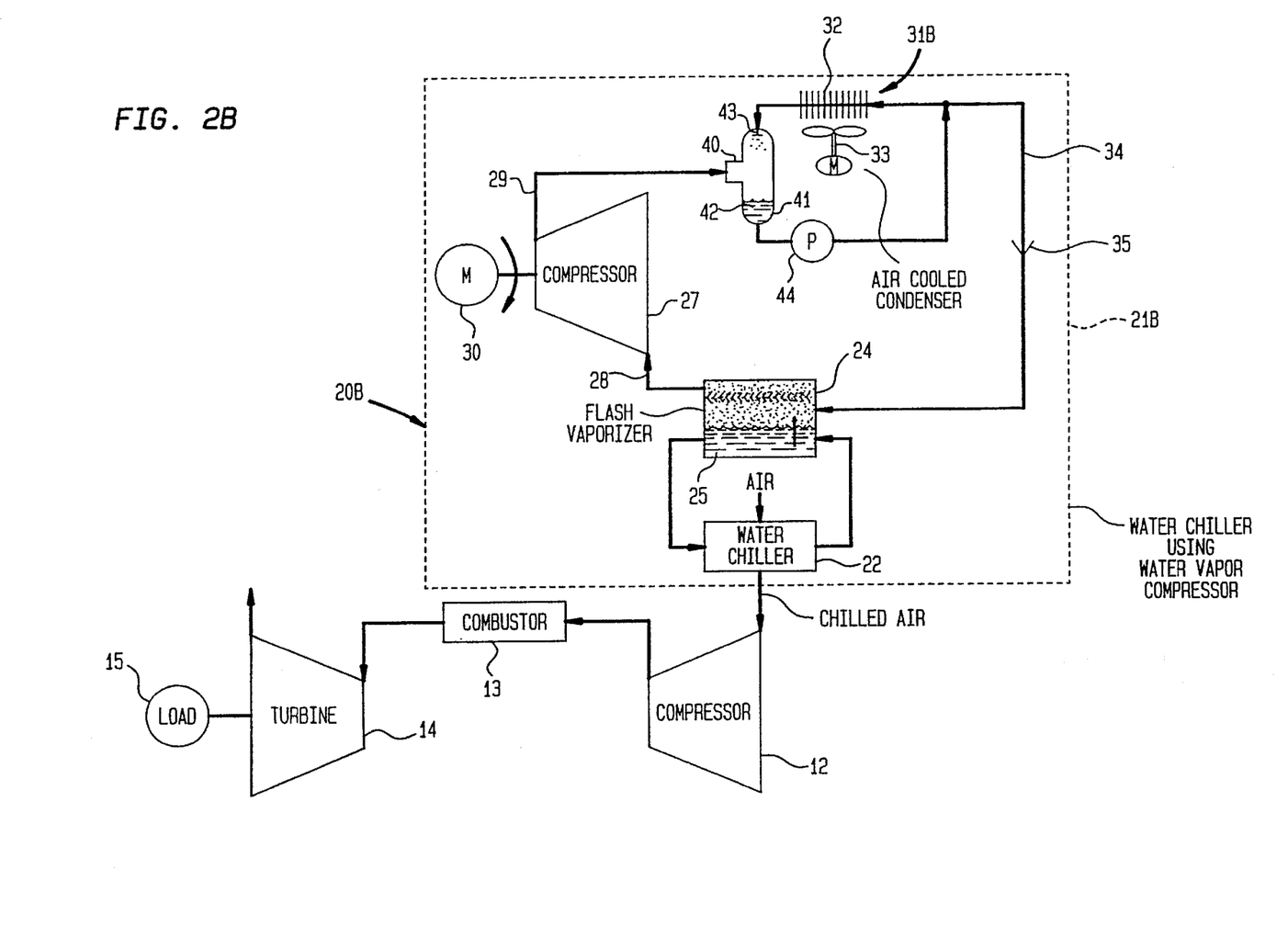
FIG. 2B is a second embodiment of an air chiller according to the present invention.

In embodiment 21B of the water chiller shown in power plant 20B in FIG. 2B, the condenser of the chiller is modified from what is shown in FIG. 2A. Specifically, condenser 31B shown in FIG. 2B includes direct contact heat exchanger 40 having sump 41 containing water 42, and spray head 43. Pump 44 pumps some of water 42 from the sump through finned tubes 32 of the condenser and the balance of the water is throttled at 35 and returned to vaporizer 24. Finned tubes 32 cool the water before it is applied to sprayhead 43 which produces droplets that directly contact the heated, compressed steam produced by auxiliary compressor 27. Finned tubes 32 thus are part of a heat exchanger interposed between sump 41 and sprayhead 43 for cooling water sprayed into direct contact heat exchanger 40. Additionally, finned tubes 32 are part of an air cooled heat exchanger.

Figure 2C:
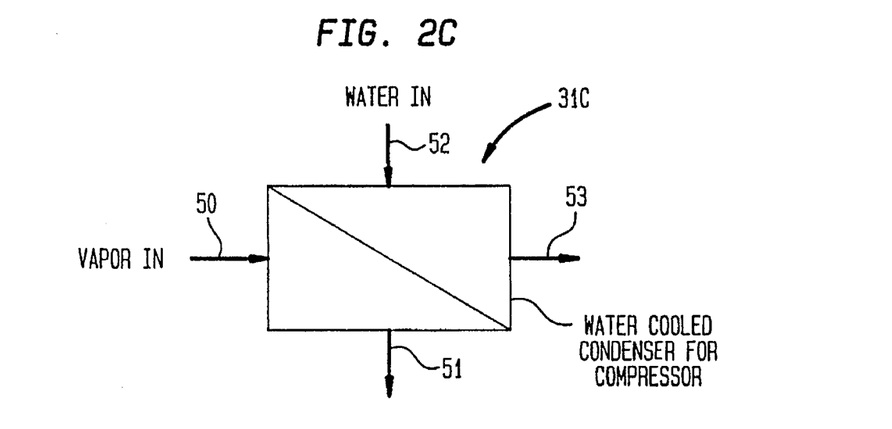
FIG. 2C is a diagram showing a further modification of a condenser for a water chiller according to the present invention.

Instead of an air cooled heat exchanger, the water being sprayed from sprayheads 43 could be cooled in indirect contact, water cooled condenser 31C shown in FIG. 2C. That is to say, condenser 31C is an indirect heat exchanger in which hot, compressed steam from compressor 27 enters inlet 50 of the heat exchanger, and is condensed into water as a result. The condensate exits at outlet 51. The heat in the vapor is extracted by cooling water that enters at 52 and exits at 53.

Figure 2D:
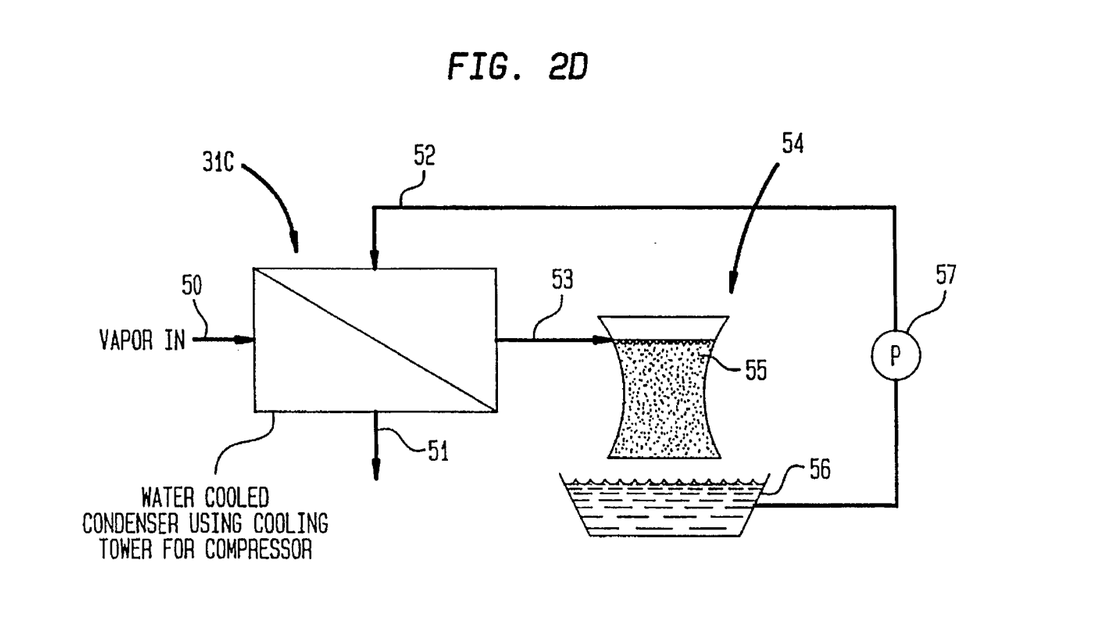
FIG. 2D is a further modification of the condenser shown in FIG. 2C.

Instead of disposing of the cooling water used in condenser 31C, a cooling tower can be utilized for recirculating the cooling water. This technique is illustrated in FIG. 2D wherein cooling tower 54 is shown in association with condenser 31C. Specifically, warmed water exiting the outlet 53 of the heat exchanger is applied to cooling tower 55 where the water is usually sprayed into ambient air transferring the heat absorbed in the condenser to the air. The resultant cooled water falls into reservoir 56 where pump 57 returns the water to inlet 52 of the condenser. Make-up water preferably is supplied to reservoir 56 to make-up for water lost in the cooling process.

Figure 2E:
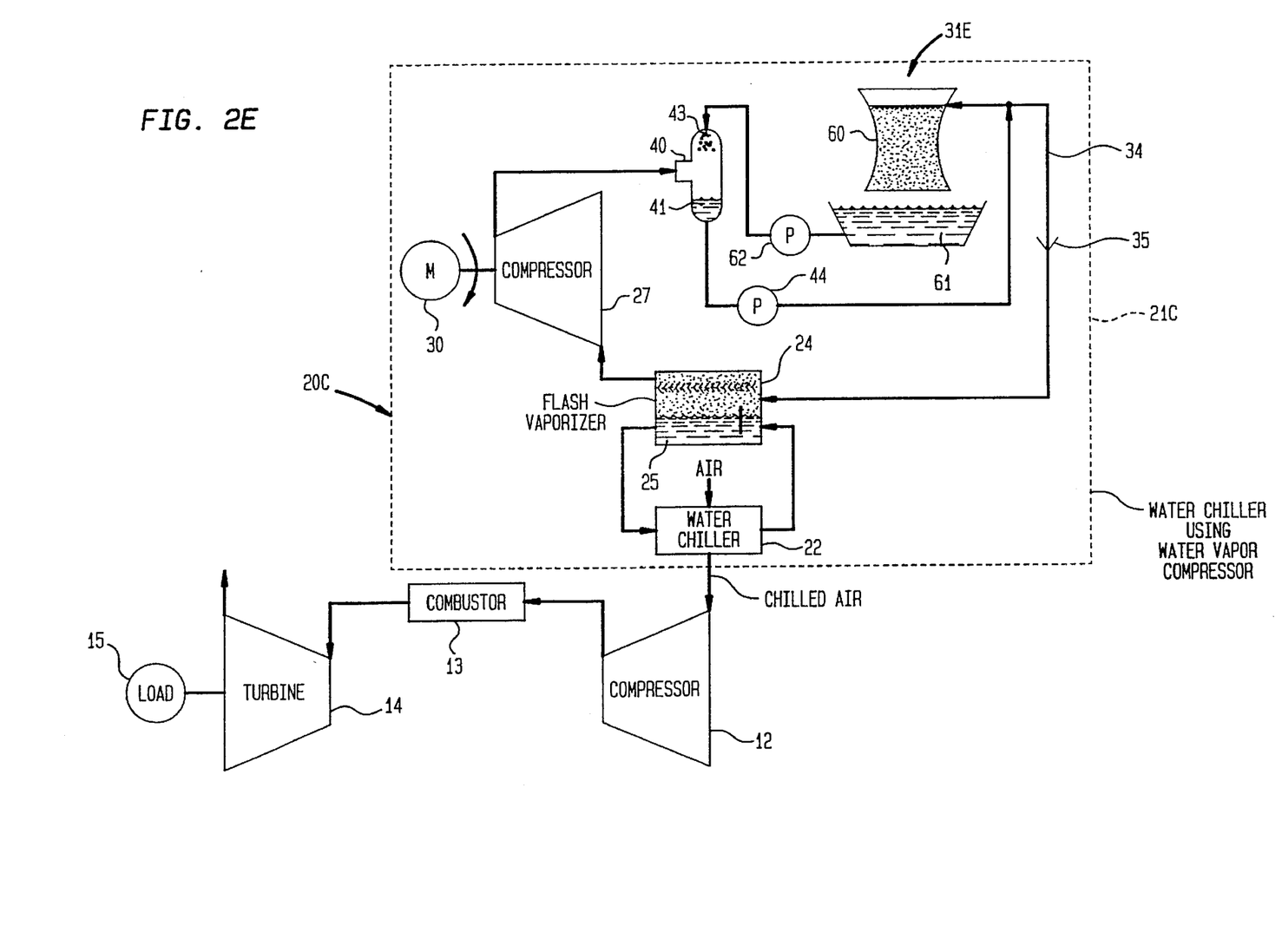
FIG. 2E is a third embodiment of an air chiller according to the present invention.

FIG. 2E of the drawing shows the incorporation of a cooling tower into a water chiller according to the present invention wherein a direct contact condenser is utilized for the vapor compressor of the water chiller. The embodiment shown in FIG. 2E operates similar to the embodiment illustrated in FIG. 2D except that condenser 31E utilizes a cooling tower for cooling the water used in condenser 40. Specifically, the water applied to sprayhead 43 is cooled using cooling tower 60 to which water is supplied via operation of pump 44. Water cooled by air, usually ambient air, collects in reservoir 61 from which pump 62 furnishes water to sprayhead 43.

Figure 3:
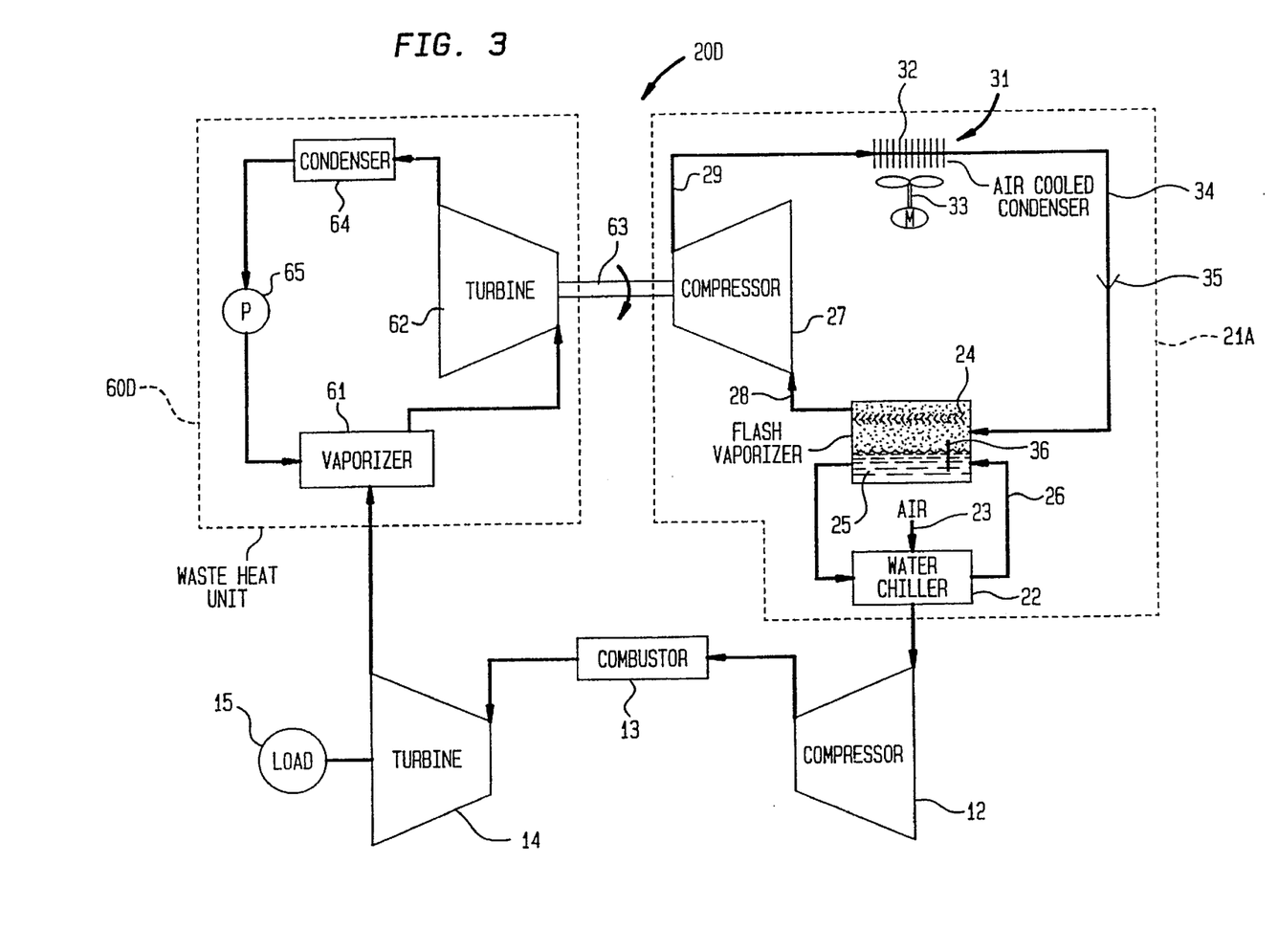
FIG. 3 is a further embodiment of apparatus according to the present invention.

Power plant 20D in FIG. 3, presently considered to be the best mode of the present invention, includes chiller 21D which provides chilled air to the inlet of compressor 12. Chiller 21D operates in the manner shown in FIG. 2, and more particularly in a manner shown in FIG. 2A in that air is supplied via indirect contact heat exchanger 22D to the inlet of compressor 12. Water vapor produced by flash vaporizer 24D is applied to compressor 27 which compresses the vapor and supplies the same to condenser 31D where condensation takes place. The liquid condensate is then returned through a restriction valve to vaporizer 24D. Compressor 27, in this embodiment, is driven by waste heat unit 60D that operates on the exhaust gases produced by turbine 14.

Waste heat unit 60D preferably operates on a closed Rankine cycle utilizing, preferably, an organic working fluid, typically pentane. Isobutane or propane may also be used. Unit 60D vaporizer 61 is responsive to exhaust gases from gas turbine 14 for vaporizing the organic working fluid which is supplied to auxiliary turbine 62 mechanically coupled via shaft 63 to auxiliary compressor 27 of chiller 21D. Turbine 62 is responsive to the vaporized working fluid produced by vaporizer 61 for driving compressor 27 as the vaporized working fluid expands to heat depleted, vaporized working fluid which is supplied to condenser 64 where condensation takes place. The condensate is transferred by pump 65 back into vaporizer 61 where the cycle repeats. Condenser 64 preferably is an air cooled condenser but a water cooled condenser is also possible. If desired, working fluids other than organic fluids can be used, such as water, ammonia, etc. It is particularly advantageous when water is used both as the working fluid for the waste heat unit, and as the fluid in the chiller. First, the same fluid is used in both cycles. Second, water is commonly available and its use gives rise to other advantages, such as simpler seals, etc.

In operation, ambient air passes through water chiller 22D and the temperature of the air is reduced to the desired level before being applied to the inlet of compressor 12. The chilled air is compressed and supplied to combustor 13 where fuel is burned producing hot gases in drive turbine 14 which powers load 15. The exhaust gases from the turbine pass through vaporizer 61 before being vented to the atmosphere- Heat contained in these gases is converted into work by reason of the vaporized working fluid which is applied to turbine 62 directly driving compressor 27 of the chiller.

Figure 3A:
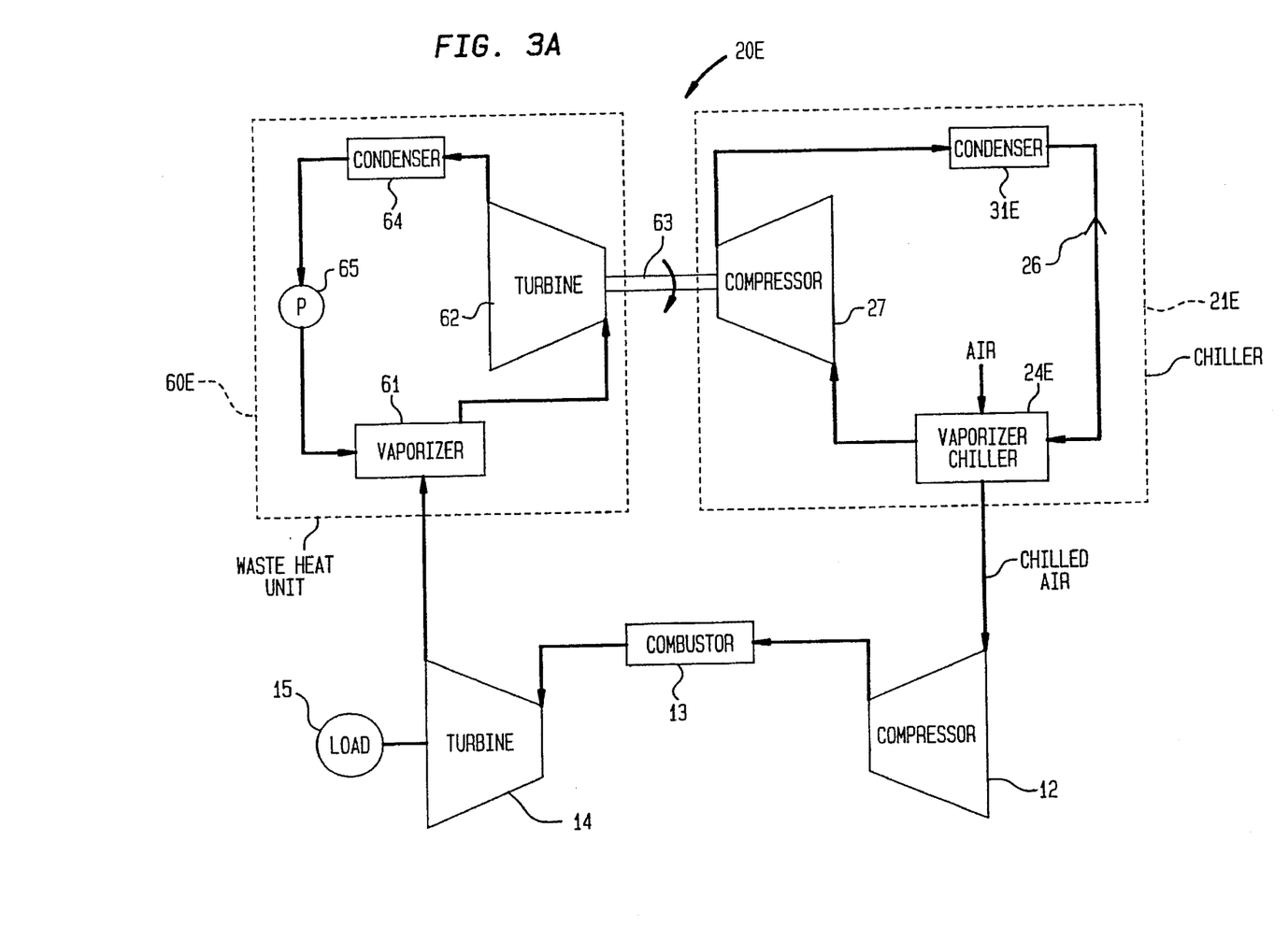
FIG. 3A is a still further embodiment of apparatus according to the present invention.

While waste heat unit 60D is shown as operating chiller 21D, unit 60D can operate with any of the embodiments shown in FIGS. 2A-E. In such cases, motor 30 can be replaced by waste heat unit 60D for operating compressor 27 which forms part of chillers 21A, 21B, and 21E respectively. Furthermore, as shown in FIG. 3A, waste heat unit 60E can be used to operate a compressor contained in the chiller which would be a conventional one operating on conventional refrigerants such as the Freons. In addition, other organic fluids which do not damage the ozone layer, such as pentane, isobutane, propane, etc. also can be used as the refrigerant for the chiller.

Power plant 20E in FIG. 3A includes chiller 21E which provides chilled air to the inlet of compressor 12. Chiller 21E operates such that vaporizer 24E vaporizes the refrigerant by extracting heat from the ambient air before the latter is applied to compressor 12. Vapor produced in vaporizer 24E is applied to compressor 27 which compresses the vapor and supplies the same to condenser 31E where the vapor condenses. The condensate flows through expansion valve 26 to vaporizer 24E. Compressor 27, in this embodiment, is driven by waste heat unit 60E that operates on the exhaust gases produced by turbine 14.

Waste heat unit 60E in this embodiment, operates on a closed Rankine cycle utilizing, preferably, an organic working fluid, typically pentane. Vaporizer 61 of unit 60E is responsive to exhaust gases from gas turbine 14 for vaporizing the organic working fluid which is supplied to auxiliary turbine 62 mechanically coupled via shaft 63 to auxiliary compressor 27 of chiller 21E. Turbine 62 is responsive to the vaporized working fluid produced by vaporizer 61 for driving compressor 27 as the vaporized working fluid expands to heat depleted, vaporized working fluid which is supplied to condenser 64 where condensation takes place. The condensate is transferred by pump 65 back into vaporizer 61 where the cycle repeats. Condenser 64 preferably is an air cooled condenser but a water cooled condenser is also possible. If desired, working fluids other than organic fluids can be used, such as water, ammonia, etc.

In the operation of this embodiment, ambient air passes through water chiller 24E and the temperature of the air is reduced to the desired level before being applied to the inlet of compressor 12. The chilled air is compressed and supplied to combustor 13 where fuel is burned producing hot gases in drive turbine 14 which powers load 15. The exhaust gases from the turbine pass through vaporizer 61 before being vented to the atmosphere. Heat contained in these gases is converted into work by reason of the vaporized working fluid which is applied to turbine 62 directly driving compressor 27 of the chiller.

Figure 4:
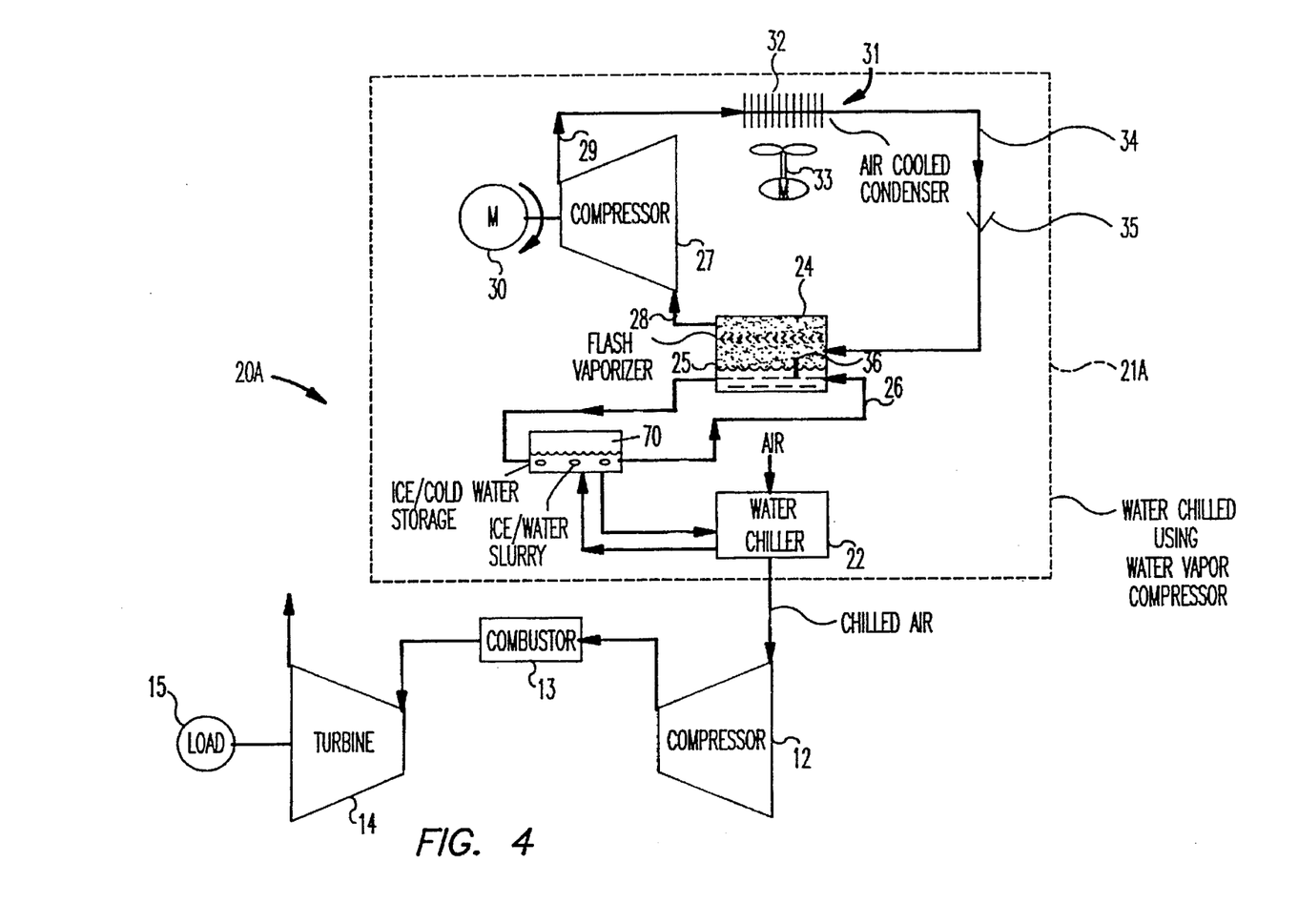
FIG. 4 is a still further embodiment of the present invention.
Figure 4A:
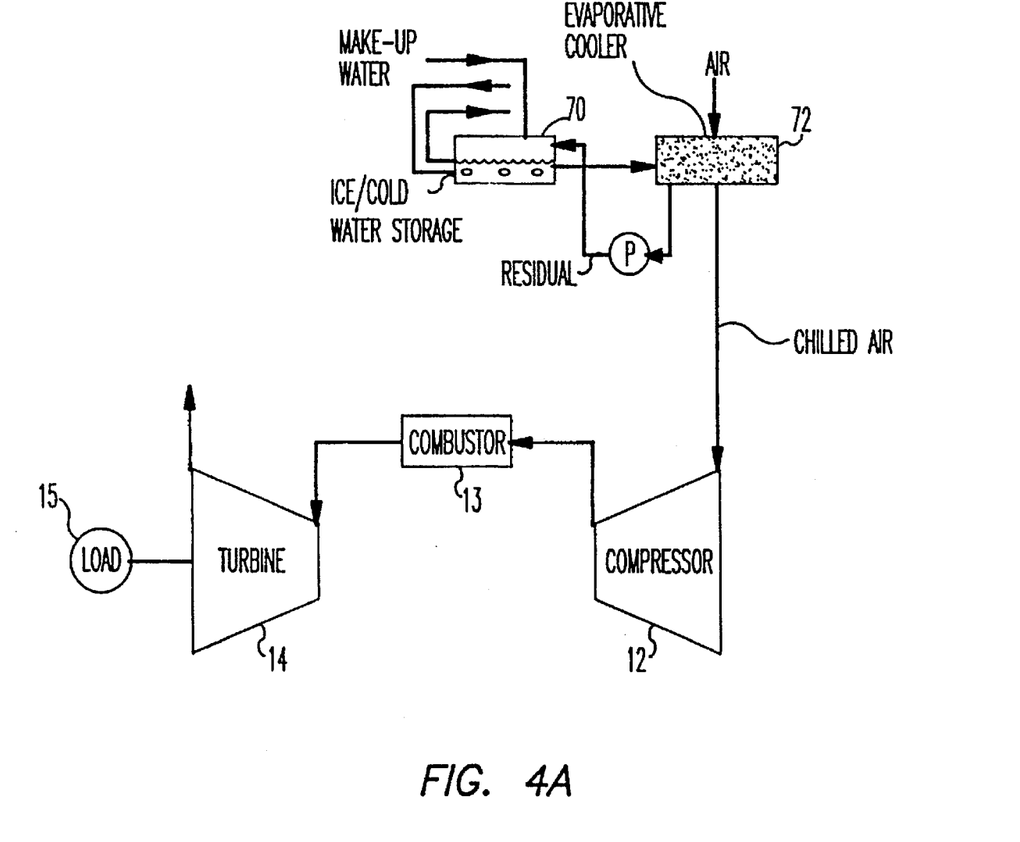
FIG. 4A is a portion of a still further embodiment of the present invention using an evaporative cooler.

In a further embodiment of the present invention, the air chiller can be operated at off-peak hours for producing cold water or ice and storing the ice or cold water produced for use in cooling the inlet air of the gas turbine during periods of peak electric power demand in a manner analogous to that disclosed in the article entitled "Combustion Turbine Inlet Cooling Project", Ebeling, J. A. and Balsbaugh, R. R., *Turbomachinery International*, Vol. 34, No.1, January/Febuary 1993, Business Journals, Inc., Norwalk, Conn., U.S.A. 06856-5550. Obviously ice storage brings about a savings in storage size. When using the ice to cool the inlet air of the gas turbine, preferably the ice is used to cool water in an ice/water slurry pool or chamber, and cooled water is then extracted from the pool and used to cool the inlet air of the gas turbine as shown in FIG. 4. Although, indirect cooling of the inlet air of the gas turbine is shown, if preferred direct cooling can be used using evaporative cooling as shown in FIG. 4A.

Figure 4B:
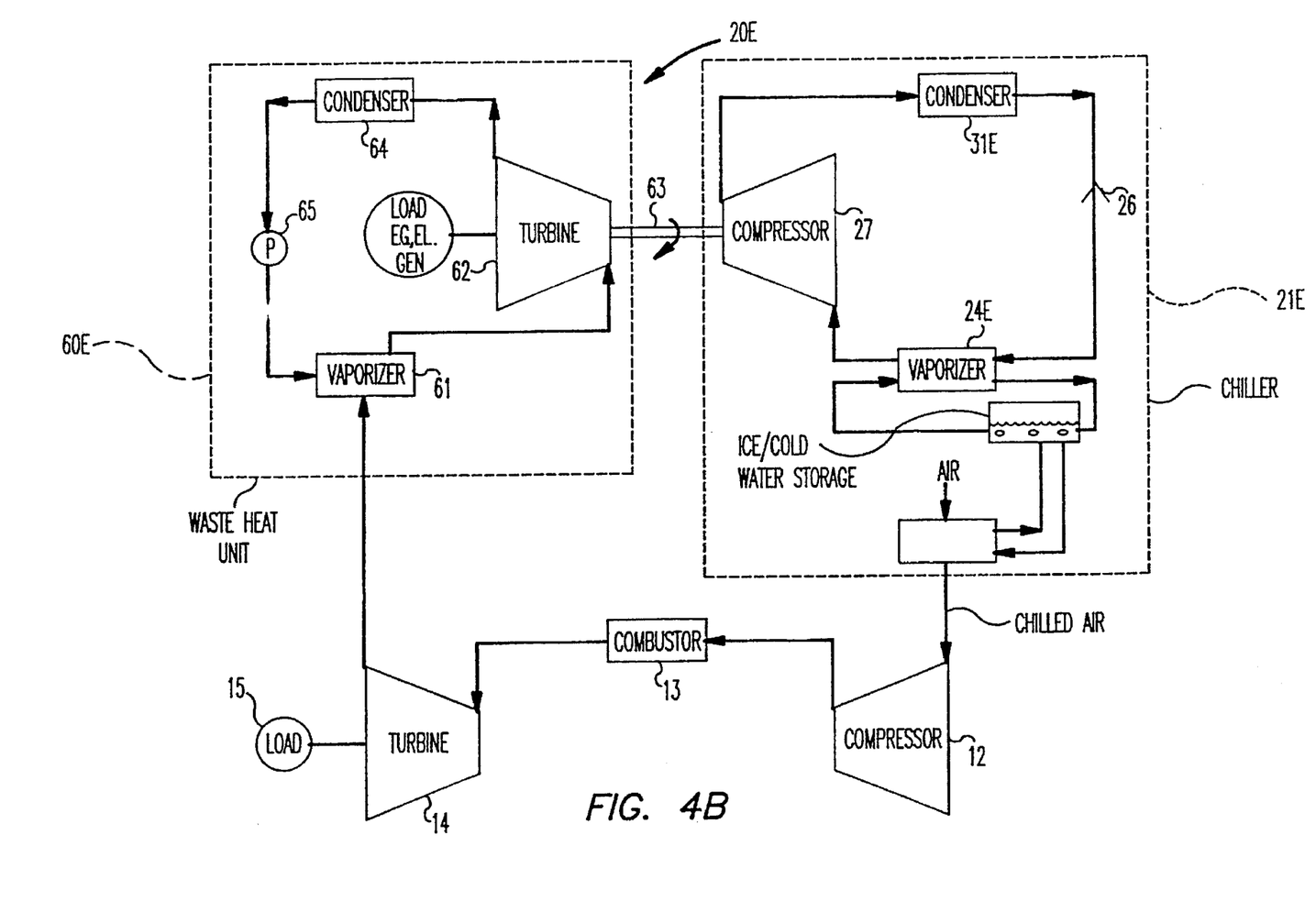
FIG. 4B is a still further embodiment of the present invention.
Figure 4C:
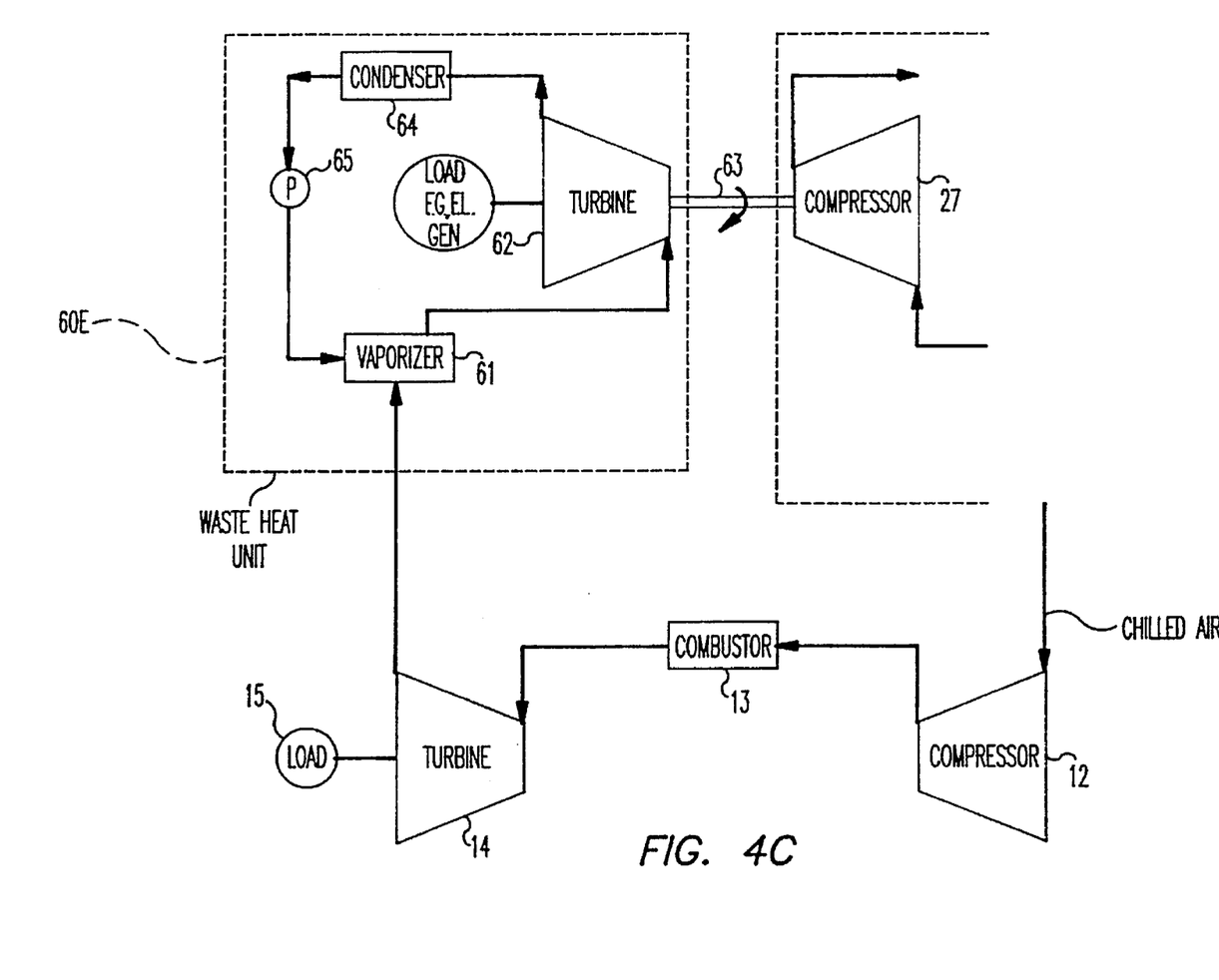
FIG. 4C shows an addition to the embodiments of the present invention shown in FIGS. 3 and 3A.

In this embodiment, preferably the water chiller arrangement described in the previous embodiments with reference to FIGS. 2, 2A to 2E and 3 are used. However, the chiller arrangement described with relation to FIG. 3A can also be used. In the arrangements where the chillers described in relation to FIGS. 3 and 3A are used, of course, power produced by the turbine contained in the waste heat units can be used to produce electricity as well as to run the compressors of the chilling units (see FIG. 4B where a load is shown as an example of electric generator for producing electricity). This is particularly useful when the working fluid of the waste heat unit is water such that the gas turbine and steam turbine contained in the unit operating on water can make up a combined cycle power plant which will usually operate continuously as a base load unit. Of course, this is the case as well in embodiments described in relation to FIGS. 3 and 3A themselves as shown in FIG. 4C.

In addition, in all the above-mentioned embodiments, in order to optimize power consumption or the Coefficient of Performance (COP), a cascaded cooling or refrigeration system can be used.

The advantages and improved results furnished by the method and apparatus of the present invention are apparent from the foregoing description of the preferred embodiment of the invention. Various changes and modifications may be made without departing from the spirit and scope of the invention as described in the appended claims.

We claim:

1. Apparatus for augmenting the power produced by a gas turbine system of the type having an air compressor for producing compressed air, a combustor for heating said compressed air and producing hot gases, and a gas turbine responsive to the hot gases for driving said air compressor and a load, and for producing exhaust gases, said apparatus comprising:
   a) a heat exchanger interposed between a source of ambient air and the air compressor;
   b) a storage containing an ice/water slurry;
   c) connections though which water in the slurry is exchanged with the heat exchanger; and
   d) a water vapor compressor connected to said storage for producing said slurry.

2. Apparatus according to claim 1 wherein said heat exchanger is an indirect contact heat exchanger.

3. Apparatus according to claim 1 wherein said heat exchanger is a direct contact heat exchanger.

4. Apparatus according to claim 1 wherein said vapor compressor includes a compressor whose inlet is connected to said storage, and an electrically operated motor connected to the compressor.

5. Apparatus according to claim 1 wherein said vapor compressor includes a compressor whose inlet is connected to said storage, and a waste heat converter including a waste heat turbine driven by exhaust gases from the gas turbine.

6. Apparatus according to claim 1 including a cascaded refrigeration system.

7. Apparatus for augmenting power produced by a gas turbine system of the type having an air compressor for producing compressed air, a combustor for heating the compressed air to produce hot gases, a gas turbine responsive to said hot gases for driving said air compressor and a load, and for producing exhaust gases, said apparatus comprising:
   a) means for cooling air supplied to the compressor;
   b) said means for cooling comprising:
      (1) a heat exchanger through which air is supplied to said compressor;
      (2) a storage containing an ice/water slurry;
      (3) connections though which water in the slurry is exchanged with the heat exchanger; and
      (4) a closed reservoir containing water;
      (5) means for exchanging ice/water slurry between said reservoir and said storage;
      (6) an auxiliary compressor having an inlet connected to said reservoir, and having an outlet;
      (7) a water vapor compressor connected to said storage for producing said slurry;
      (8) drive means for operating said auxiliary compressor to reduce the pressure in said reservoir thereby producing water vapor which reduces the temperature of the water remaining in the reservoir, said water vapor being compressed by the operation of said auxiliary compressor to produce heated, compressed water vapor at said outlet.

8. Apparatus according to claim 6 wherein said drive means includes:
   a) a vaporizer containing liquid working fluid and responsive to exhaust gases from said gas turbine for producing vaporized working fluid from liquid working fluid;
   b) an auxiliary turbine mechanically coupled to said auxiliary compressor and responsive to said vaporized working fluid for expanding the latter to drive said auxiliary compressor and producing heat depleted working fluid;
   c) an auxiliary condenser responsive to said heat depleted working fluid for condensing the same; and
   d) means for pumping condensate from said auxiliary condenser to said vaporizer.

9. Apparatus according to claim 8 wherein the working fluid is water.

10. Apparatus according to claim 8 wherein the working fluid is an organic fluid.

11. Apparatus according to claim 8 wherein said heat exchanger is a direct contact heat exchanger.

12. Apparatus according to claim 8 wherein said heat exchanger is an indirect contact heat exchanger.

13. Apparatus according to claim 7 including a cascaded refrigeration system.

* * * * *